INVENTOR.
Buchanan Loesch
BY
Morse & Altman
ATTORNEYS

Feb. 25, 1969 B. LOESCH 3,430,240
FREQUENCY MODULATED PULSE TRANSMISSION AND RECEPTION
DEVICES UTILIZING ELECTRO-OPTICAL TRANSDUCTION
Filed July 5, 1961 Sheet 2 of 2

INVENTOR.
Buchanan Loesch
BY
Morse & Altman
ATTORNEYS

United States Patent Office 3,430,240

Patented Feb. 25, 1969

3,430,240

FREQUENCY MODULATED PULSE TRANSMISSION AND RECEPTION DEVICES UTILIZING ELECTRO-OPTICAL TRANSDUCTION

Buchanan Loesch, Reading, Mass., assignor, by mesne assignments to the United States of America as represented by the Secretary of the Army Continuation-in-part of application Ser. No. 833,107, Aug. 11, 1959. This application July 5, 1961, Ser. No. 124,289

U.S. Cl. 343—17.2 4 Claims

Int. Cl. G01s 7/28

Figures 1A, 1B, 1C, 1D, 1E, 1F:
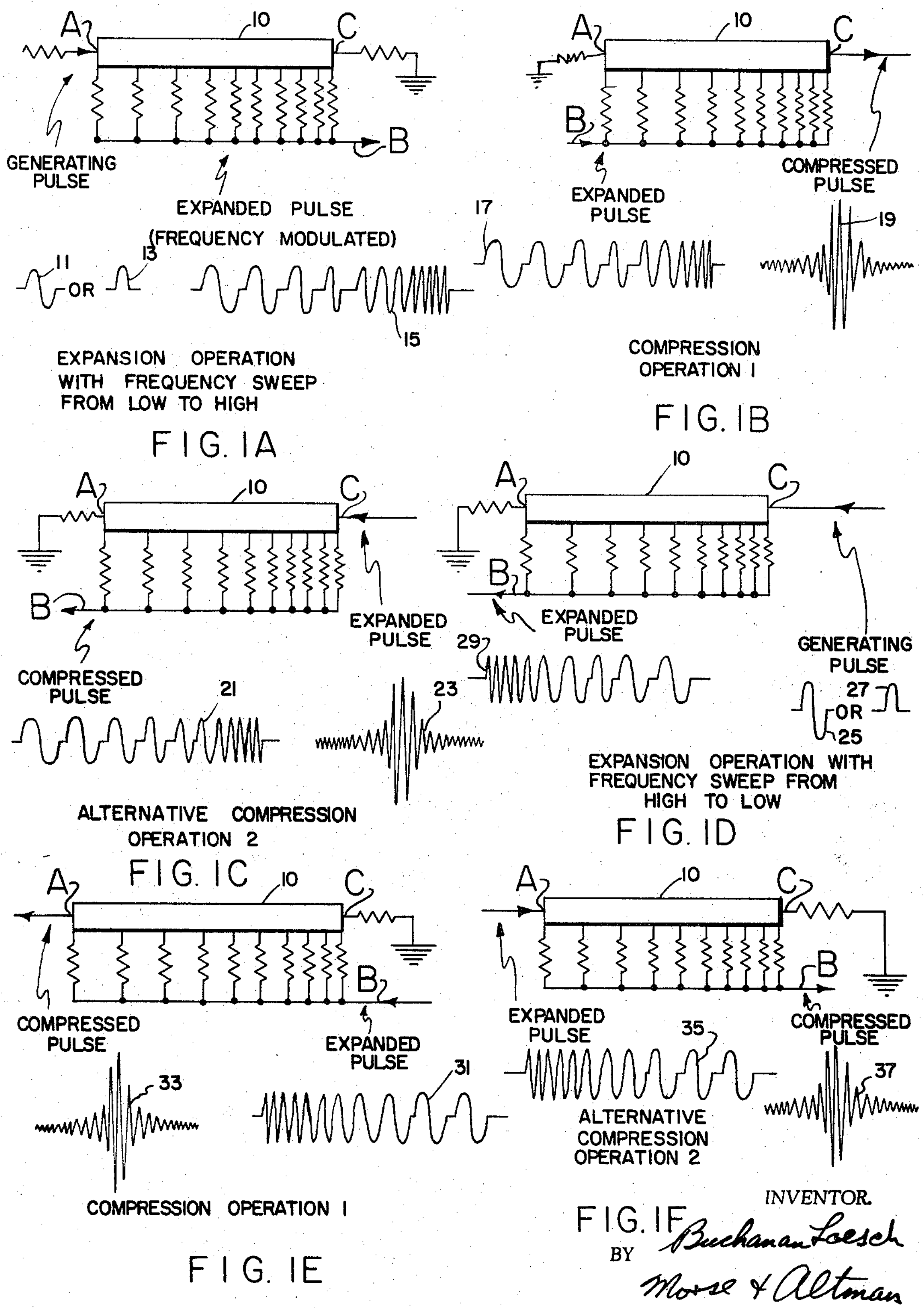

The present application is a continuation in part of a copending application Ser. No. 833,107, filed on Aug. 11, 1959 in the name of Buchanan Loesch for Frequency Modulated Wave Pulse Transmission and Reception.

The present invention relates to the transmission and reception of energy and, more particularly, to the generation and use of discrete pulses of frequency modulated radiation, sometimes called chirp radiation. Such radiation, for example, is useful in radar systems where sharp range resolution is desired. Prior chirp systems have been characterized by transmitting and receiving units that have been relatively difficult to match and tune and relatively complex to design and fabricate.

The copending patent aplication discloses the generation of chirp radiation by a so-called pulse compression and expansion unit in the form of a delay line having first and second end terminals and a plurality of intermediate taps that are sequentially spaced therealong at functionally varying distances from each other and are connected in common to a composite intermediate terminal. The construction is (1) such that a first pulse of a given duration when applied to a first of the terminals generates a second pulse of expanded duration at one of the second and third of the terminals and (2) such that the second pulse when applied to one of the second and third of the terminals generates a third pulse of compressed duration at the other of the second and third of the terminals. In accordance with conventional theory each of the first, second and third pulses may be considered to be characterized by a Fourier series representing a multiplicity of sinusoidal waves. However, in accordance with the present invention, the second pulse is matched to the impedence presented to it. In other words, the construction is a filter which is matched to an expanded wave which it may generate.

The object of the present invention is to provide a novel unit for matched compression and expansion of the foregoing type, of unusual versatility by virtue of a novel optical arrangement in which an optical medium, positioned between a radiation source and a radiation detector, is provided with a series of taps in the form of optical ports, of functionally varying spacing, which transmit the radiation in a sequence that is determined by sequential incremental physical variations in the optical medium. These incremental variations are produced by transduction in any of a variety of ways. More spceifically, the illustrated embodiment of the present invention comprises: a collimated radiation source; polarizing and quarter wave strata for transmitting circularly polarized radiation from the source; a medium having an entrance face for the circularly polarized radiation and an exit for emitting increments of radiation from increments of the medium; a mask defining slits of sequentially varying spacing for passing selected increments of radiation; a first transducer for generating a travelling wave in the medium by which increments of the medium in a first sequence convert increments of the radiation from circularly to linearly polarized configuration; a second tranducer for generating a travelling wave in the medium by which increments of the medium in a second sequence convert increments of the radiation from circularly to linearly polarized configuration; an analyzer by which increments of radiation from the slits are selectively transmitted; and a photocell for receiving increments of radiation so transmitted in order to generate an electrical output signal. It will be appreciated that the particular waveform for which the expansion-compression unit is designed is determined by the distribution of slits on the mask, which may be produced by photographic, etching or other similarly simple techniques. The mask therefore is adapted for interchangeability, in consequence of which the elements of a standard expansion-compression unit may be incorporated in a variety of electronic systems.

Other objects of the present invention will in part be obvious and will in part appear hereinafter.

The invention accordingly comprises the components and systems possessing the construction, combination of elements and arrangement of parts, which are exemplified in the following detailed disclosure and the scope of the application of which will be indicated in the appended claims.

Figure 2:
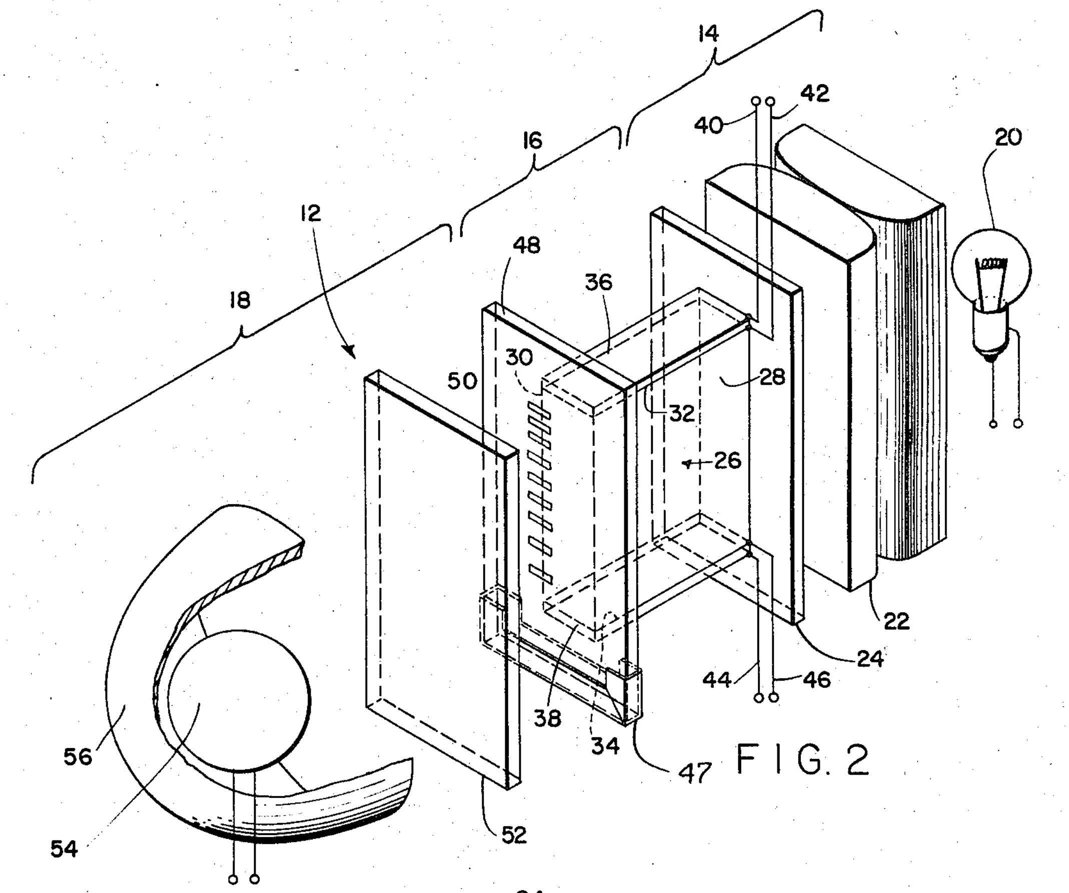
Figure 3:
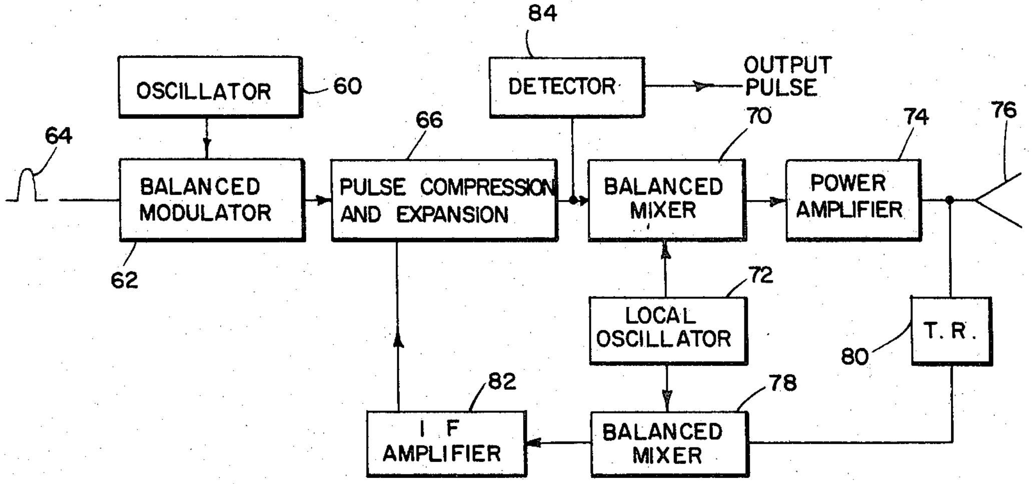

For a fuller understanding of the nature and objects of the present invention, reference should be had to the following detailed description, taken in connection with the accompanying drawings wherein:

FIGS. 1(*a*) through 1(*f*) are diagrams illustrating the operation of a pulse expansion-compression unit of the present invention;

FIG. 2 is a perspective view of a pulse expansion-compression unit embodying the present invention; and FIG. 3 is an explemplary chirp radar system comprising the pulse expansion- compression unit of FIG. 1.

With reference first to FIG. 1, a unit of the type herein contemplated comprises a delay unit 10 having a pair of individual terminals A and C and a plurality of intermediate taps *a, b, c . . . n* which are connected in parallel to a composite terminal B. It will be observed that the spacing between intermediate taps *a, b, c . . . n*, decreases sequentially in the direction from individual terminal A to individual terminal C.

It can be shown both experimentally and theoretically, that:

(a) A generating pulse 11 or 13 applied to individual terminal A results in an expanded pulse 15 of increasing frequency at composite terminal B;

(b) An expanded pulse 17 of increasing frequency (like pulse 15) applied to composite terminal B results in a compressed pulse 19 at individual terminal C;

(c) An expanded pulse 21 (like pulses 15 and 17) applied to individual terminal C results in a compressed pulse 23 (like pulse 19) at composite terminal B;

(d) A generating pulse 25 or 27 applied to individual terminal C results in an expanded pulse 29 of decreasing frequency at composite terminal B;

(e) An expanded pulse 31 (like pulse 29) applied to composite terminal B results in a compressed pulse 33 at individual terminal A; and (f) An expanded pulse 35 (like pulses 29 and 31) applied to individual A results in a compressed pulse 37 (like pulse 33) at individual terminal B.

The matching feature of the compression and expansion unit, which is an essential advantage of the present invention may be understood from the following. This unit by itself is not an exact matched filter to the transmitted waveform because the generating pulse into the unit is a gated sinusoid rather than a true impulse. In other words, a small increment of a sinusoidal wave form is utilized as the initial input to the compression and expansion unit. The resulting expanded wave form, when returned as in a radar system from a target, is converted by the compression and expansion unit to a final impulse. The initial input and the final impulse are not identical, as would be the case if the match were exact. It is important therefore to consider at least qualitatively how closely this unit approximates a matched filter. For this purpose let us consider the network response in the frequency domain.

For a unit with arbitrary tap spacing we can express the frequency response as a summation of sine waves, each of amplitude $k_n$ and phase determined by tap delay; thus:

$$\frac{e_b}{e_a}=\sum_{0}^{N} k_n e^{-j\omega T_n}$$

$e_b$=summing bus output
$e_a$=constant amplitude input to end A
$T_n$=time delay from end A to tap $n$ The inverse frequency response with input at end C and output again from the summing bus may be written as $$\frac{e_b}{e_c}=\sum_{0}^{N} k_n e^{-j\omega(T-T_n)}=e^{-j\omega T}\sum_{0}^{N} k_n e^{+j\omega T_n}$$

where T is the time delay from A to C. It will be noted from a comparison of the two frequency response expressions that each term of each summation is equal in magnitude and conjugate in phase with its mate and therefore the two summations are obviously equal in magnitude and conjugate in phase. The term $e^{-j\omega T}$ represents a distortionless all-pass network of fixed time delay T.

In the theoretical ideal, it may be shown that the sinusoidal input pulse is represented as an impulse input passed through a sin $x/x$ filter. It should be noted that no such filter is actually used in the illustrated system, but the actual input signal to the unit may be regarded as having been mathematically thus produced. If now we were to add to the receiving channel a fictitious sin $x/x$ filter with conjugate phase, we should then have a receiver with identical amplitude response and conjugate phase to the transmitter. The transmitted and received impulses then would exactly correspond.

The sin $x/x$ filter which is mathematically required cannot be constructed, but as a practical matter, its absence may be neglected because its effect would be quite small. This lack of effect becomes evident when it is realized that the amplitude response of the unit must be narrow compared to the spectrum width of the sinusoidal input pulse in order to obtain a flat-topped transmitted pulse. The sin $x/x$ filter would therefore have nearly constant response over the frequency range of interest and is therefore not of practical importance.

Now referring to the expansion-compression unit illustrated in FIG. 2, this unit is shown at 12 as including a source 14 of circularly polarized radiation such as light, an optical path 16 susceptible to incremental change in polarizing properties and a radiation analyzer and detector 18 for receiving radiation from these increments.

As shown, source 14 includes a lamp 20, a collimator 22 and a circularly polarizing element 24. Circularly polarizing element includes laminated linearly polarizing and quarter wave strata. Path 16 is provided by a solid medium 26, composed for example of quartz, having an entrance face 28, an exit face 30 and a pair of transverse faces 32 and 34. Entrance face 28 and exit face 30 are optically flat. Transverse faces 32 and 34 are provided with electroacoustic transducers 36 and 38, respectively, composed for example of quartz or barium titanate. Each of transducers 36 and 38 is in the form of a piezoelectric stratum sandwiched between a pair of conductive coatings and bonded to the corresponding face of solid medium 26. The conductive coatings of each of transducers 34 and 36 are connected between leads 40, 42 and 44, 46 in such a way that either transducer 34 or 36 may produce a transversely travelling wave in either the shear or longitudinal mode. Solid medium 26, by virtue of its birefringent properties, is capable of partially converting the circularly-polarized incident light to linearly polarized light in response to the deformation produced at sequential increments by the travelling wave. Analyzing and detecting component 12 includes an opaque screen 48 provided with a series 50 of slits which are spaced sequentially at increasing distances from each other in the direction from transducer 36 to transducer 38. Screen 48 is removably retained by a holder 47 so as to be interchangeable with other screens having slits of different spacings. Radiation emitted through slits 50 is transmitted through a linear polarizer 52 to a photocell 54 with the aid of a mirror 56 by which the radiation is focused toward detector 54.

In the foregoing device, terminals 40, 42, and 44, 46 correspond to terminals A and B and photodetector 54 corresponds to terminal C of FIG. 1. In other words, a pulse applied between terminals 40 and 42 will generate a travelling wave in a direction through element 26 transversely with respect to the axis of the optical system. This wave causes successive increments of element 26 to be subjected to instantaneous stress or strain by which the circularly polarized radiation is converted to linearly polarized radiation. The incremental linearly polarized radiation emitted from slits 50 is transmitted through linear polarizer 52 in greater or lesser proportions. The resulting sequential impulses impinge upon photodetector 54 in correspondence with the impulses described above in FIG. 1, at *a, b, c . . . n.*

FIG. 3 shows a simplified block diagram of an X-band radar system that operates as follows. An oscillator 60 supplies a continuous wave signal to a modulator circuit 62, which is keyed by an input pulse 64. The pulse output is passed through pulse expansion-compression unit 66 of the type shown in FIG. 2, which expands the pulse width. The expanded pulse then is mixed as at 70 with an X-band signal generated as at 72, is amplified by a high power travelling wave tube 74 and transmitted by antenna 76. For reception, the X-band signal from local oscillator 72 is mixed as at 78 with the received signal as intercepted by antenna 76 and applied through a TR box 80 to a mixer 78. The output of mixer 78, which is a replica of the expanded pulse generated by pulse expansion-compression unit 66, is amplified by intermediate frequency amplifier 82 and applied for compression to pulse expansion-compression unit 66. The compressed pulse unit 66 is envelope detected by a suitably gated detector 84 and constitutes the desired information. In the foregoing system with respect to pulse compression and expansion unit 66, the inputs from balanced modulator 62 and intermediate frequency amplifier 82 correspond to input pairs 40, 42 and 44, 46 of FIG. 2 respectively and the output from pulse compression and expansion unit 66 corresponds to photocell 54 of FIG. 2.

The present invention thus provides components and systems in which compressed and expanded pulses may be simply produced and related to each other. Since certain changes may be made in the above components and systems without departing from the scope of the invention herein involved, it is intended that all matter containing in the above description or shown in the accompanying drawing shall be interpreted in an illustrative and not in a limiting sense.

What is claimed is:

1. A pulse expansion-compression unit comprising a solid medium providing a path between an entrance face and an exit face, a source of circularly polarized radiation at said entrance face, a mask associated with said exit face, said mask providing a series of openings of varying sequential spacing, transducing means for generating a travelling wave through said medium in order to convert said circularly polarized radiation to linearly polarized radiation, analyzing means at said exit face for attenuating said linearly polarized radiation, and detecting means for receiving said linearly polarized radiation from said analyzing means, said transducing means including a first electro-acoustic transducer and a second electro-acoustic transducer coupled to said solid medium at opposite extremities of said series of openings.

2. A radar system comprising means for generating a given pulse, frequency modulating means, means for applying said pulse to said frequency modulating means to produce a modulated pulse, means for transmitting said modulated pulse, means for receiving said modulated pulse, and means for applying said modulated pulse to said frequency modulating means in order to produce a pulse similar to said given pulse, said frequency modulating means comprising at least one unit, said unit including a source of radiation, a solid medium for transmitting said radiation from an entrance to an exit along an optic axis, a mask at said exit provided with a series of exit increments, said exit increments being spaced at varying distances from each other, photodetecting means for receiving increments of radiation from said exit increments, first transducing means for causing said radiation increments to be transmitted through said exit increments in a first sequence in response to a given input, and second transducing means for causing said radiation increments to be transmitted through said exit increments in a second sequence.

3. The radar system of claim 2 wherein said first transducing means and said second transducing means are electroacoustic.

4. The radar system of claim 3 wherein said solid medium is quartz.

References Cited

UNITED STATES PATENTS

| | | | |
|---|---|---|---|
| 2,557,974 | 6/1951 | Barney | 343—100.7 |
| 2,418,964 | 4/1947 | Arenberg | 343—13 |
| 2,451,465 | 10/1948 | Kibler | 88—61 |

RODNEY D. BENNETT, *Primary Examiner.*

JEFFREY P. MORRIS, *Assistant Examiner.*